(12) United States Patent
Kempton

(10) Patent No.: US 8,116,915 B2
(45) Date of Patent: Feb. 14, 2012

(54) METHODS AND APPARATUS USING HIERARCHICAL PRIORITY AND CONTROL ALGORITHMS FOR GRID-INTEGRATED VEHICLES

(75) Inventor: Willett Kempton, Newark, DE (US)

(73) Assignee: University of Delaware, Newark, DE (US)

( * ) Notice: Subject to any disclaimer, the term of this patent is extended or adjusted under 35 U.S.C. 154(b) by 335 days.

(21) Appl. No.: 12/397,030

(22) Filed: Mar. 3, 2009

(65) Prior Publication Data

US 2009/0222143 A1    Sep. 3, 2009

Related U.S. Application Data

(60) Provisional application No. 61/033,116, filed on Mar. 3, 2008.

(51) Int. Cl.
G05D 3/12 (2006.01)
G05D 5/00 (2006.01)
G05D 9/00 (2006.01)
G05D 11/00 (2006.01)
G05D 17/00 (2006.01)
B60L 9/00 (2006.01)
B60L 11/00 (2006.01)
B60K 1/00 (2006.01)
H02J 7/00 (2006.01)

(52) U.S. Cl. .......... 700/291; 700/295; 700/297; 701/22; 180/65.1; 180/65.21; 180/65.29; 320/124; 320/125

(58) Field of Classification Search .................. 700/22, 700/286, 291, 295, 297–298; 701/22; 180/65.1, 180/65.21, 65.29; 320/124–125; 907/903, 907/907
See application file for complete search history.

(56) References Cited

U.S. PATENT DOCUMENTS 5,499,181 A    3/1996 Smith
(Continued)

FOREIGN PATENT DOCUMENTS

WO    WO 2006/121761    11/2006
(Continued)

OTHER PUBLICATIONS

Willett Kempton, Jasna Tomić, Steven Letendre, Alec Brooks, Timothy Lipman; Vehicle-to-Grid Power: Battery, Hybrid, and Fuel Cell Vehicles as Resources for Distributed Electric Power in California, 2001; 92 Pages Prepared for: California Air Resources Board and the California Environmental Protection Agency (under contract #ARB00-612, Feasibility of Electric Drive Vehicles as Distributed Power Generation Assets in California), and Los Angeles Department of Water and Power, Electric Transportation Program; Publication Request: Inst. of Transportation Studies, University of California, Davis, CA.

(Continued)

Primary Examiner — Ramesh Patel
(74) Attorney, Agent, or Firm — Gary M. Machetta

(57) ABSTRACT

A method and apparatus for managing system energy flow. The apparatus includes an energy storage unit to store energy to be used by a system and a power conversion unit configured to be coupled between the energy storage unit and a utility grid. The apparatus also includes a controller to selectively control the power conversion unit to transfer energy between the utility grid and the energy storage unit based at least in part on an anticipated use of the system.

31 Claims, 8 Drawing Sheets

U.S. PATENT DOCUMENTS

| | | | |
|---|---|---|---|
| 5,572,109 | A | 11/1996 | Keith |
| 5,583,418 | A | 12/1996 | Honda |
| 5,767,584 | A | 6/1998 | Gore et al. |
| 6,107,691 | A * | 8/2000 | Gore et al. ............... 290/1 R |
| 6,356,877 | B1 | 3/2002 | Schulden |
| 6,925,361 | B1 * | 8/2005 | Sinnock .................. 700/286 |
| 7,040,430 | B2 * | 5/2006 | Nomura et al. ............ 180/65.1 |
| 7,274,975 | B2 | 9/2007 | Miller |
| 7,550,861 | B2 * | 6/2009 | Oyobe et al. ............. 290/40 C |
| 7,565,224 | B2 * | 7/2009 | Fairlie et al. ............. 700/266 |
| 7,582,979 | B2 * | 9/2009 | Oyobe et al. ............. 290/1 R |
| 7,590,472 | B2 * | 9/2009 | Hakim et al. ............. 700/295 |
| 7,612,466 | B2 * | 11/2009 | Skutt ....................... 307/29 |
| 7,740,092 | B2 * | 6/2010 | Bender .................... 180/65.29 |
| 7,783,390 | B2 * | 8/2010 | Miller ..................... 700/291 |
| 7,792,613 | B2 * | 9/2010 | Kressner et al. ............ 700/296 |
| 2004/0110044 | A1 * | 6/2004 | McArthur et al. ........... 429/13 |
| 2006/0250902 | A1 * | 11/2006 | Bender et al. .............. 369/1 |
| 2007/0068714 | A1 | 3/2007 | Bender |
| 2007/0271006 | A1 | 11/2007 | Golden et al. |
| 2007/0282495 | A1 | 12/2007 | Kempton et al. |
| 2008/0167756 | A1 * | 7/2008 | Golden et al. ............. 700/297 |
| 2008/0281663 | A1 * | 11/2008 | Hakim et al. .............. 705/8 |
| 2009/0091291 | A1 | 4/2009 | Woody |
| 2009/0189456 | A1 * | 7/2009 | Skutt ....................... 307/87 |
| 2009/0210357 | A1 | 8/2009 | Pudar |
| 2009/0222143 | A1 | 9/2009 | Kempton |
| 2009/0228388 | A1 | 9/2009 | Axelrod et al. |
| 2009/0229900 | A1 | 9/2009 | Hafner |
| 2009/0259603 | A1 | 10/2009 | Housh |
| 2009/0313033 | A1 | 12/2009 | Hafner |

FOREIGN PATENT DOCUMENTS

| | | |
|---|---|---|
| WO | WO 2007/037972 | 4/2007 |
| WO | 2008073476 | 6/2008 |

OTHER PUBLICATIONS

Willett Kempton, Jasna Tomić; *Vehicle-to-grid power implementation: From stabilizing the grid to supporting large-scale renewable energy*; University of Delaware, Newark, DE 19716, USA (Received Nov. 12, 2004; received in revised form Dec. 8, 2004; accepted Dec. 8, 2004); 15 Pages Journal of Power Sources; Available online at www.sciencedirect.com.

Willett Kempton, Jasna Tomić; *Vehicle-to-grid power fundamentals: Calculating capacity and net revenue*; University of Delaware, Newark, DE 19716, USA (Received Nov. 12, 2004; received in revised form Dec. 8, 2004; accepted Dec. 8, 2004); 12 Pages Journal of Power Sources; Available online at www.sciencedirect.com.

Willett Kempton, Steven E. Letendre; *Electric Vehicles as a New Power Source for Electric Utilities*; Transpn Res.-D., vol. 2, No. 3, pp. 157-175, 1997, Elsevier Science Ltd., PII: S1361-9209(97)00001-1.

International Search Report for PCT/US2010/049819 filed Sep. 22, 2010, mailed Apr. 12, 2011.

Written Opinion for PCT/US2010/049819 filed Sep. 22, 2010, mailed Apr. 12, 2011.

International Search Report for PCT/US2010/049761 filed Sep. 22, 2010, mailed Apr. 11, 2011.

Written Opinion for PCT/US2010/049761 filed Sep. 22, 2010, mailed Apr. 11, 2011.

International Search Report for PCT/US2010/049756 filed Sep. 22, 2010, mailed Apr. 12, 2011.

SAE Electric Vehicle and Plug in Hybrid Electric Vehicle Conductive Charge Coupler, SAE Standard J1772TM Jan. 2010, Issued Oct. 1996, Revised Jan. 2010.

Guille et al., "A Conceptual Framework for the Vehicle-to-Grid (V@G) Implementation," Elsevier, Energy Policy 38 (2009), pp. 4379-4390.

* cited by examiner

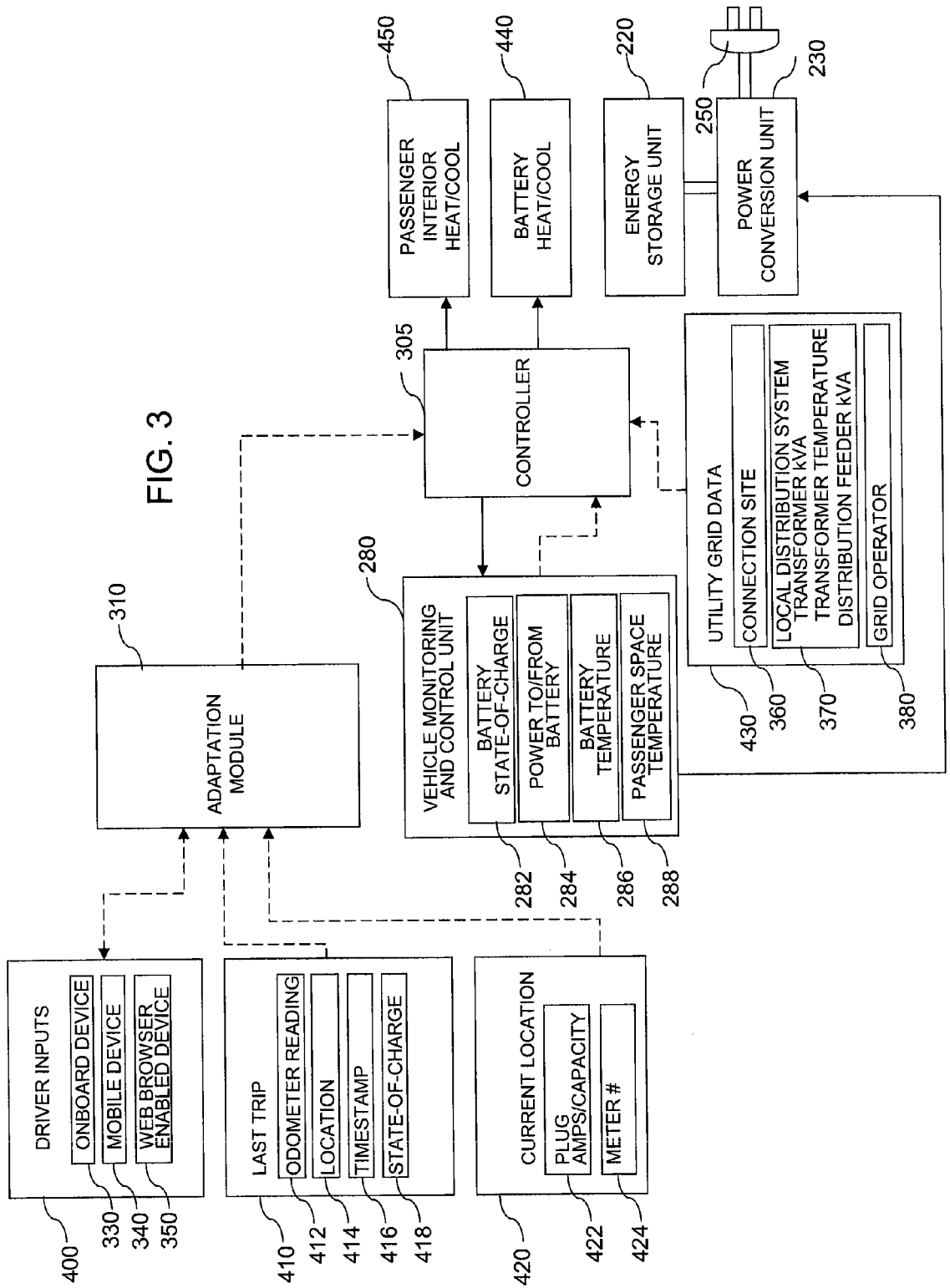

FIG. 4A

| Driver and table settings | | | |
|---|---|---|---|
| DriverID=1234 | Experience base: 275 days | Minimal range: 15 miles | |

| Schedule Probabilities | | | |
|---|---|---|---|
| Time | Trip | Plug | Probability |
| 4:00 am | Parked at home | 16 kW | 1.00 |
| 5:00 | Parked at home | 16 kW | .99 |
| | Drive 10 miles, 2.8 kWh | - | .01 |
| 6:00 | Drive 10 miles, 2.8 kWh | - | .59 |
| | Parked at home | 16 kW | .40 |
| | Parked at work | 19 kW | .01 |
| 7:00 | Drive 10 miles, 2.8 kWh | - | .40 |
| | Parked at work | 19 kW | .60 |
| 8:00 | Parked at work | 19 kW | 1.00 |
| (continues 24 hours) | | | |

|  | Plug Capacity | Meter # | GPS | Meter (kWh) bill to | Grid Service credits to | Prob. Of finding plug |
|---|---|---|---|---|---|---|
| Home | 19.2 kW | 1234567890 |  | Me | me | 100% |
| Work | 10.4 | 3456789012 |  | Office | Me | 85% |
| Transit | 16.6 kW | varies |  | Transit | Transit | 60% |

30 InitialSetup:
  AWAIT DriverLogin
  Query(TypicalSchedule)
  Query(MinimalRange)
  IF QuerySuccessful
      THEN SetDriverTable(Answers)
      ELSE SetDriverTable(NightChargeDefault)
  PropogateToOtherDevices
  ConfirmToDriver 31 Ongoing Operation:
   If DriverTable = empty then GOTO InitialSetup
32 EventLoop on
33 Unplug: Update DriverTable
34 Plugin:
     Update DriverTable
     Estimate NextVehicleUse based on DriverTable
     Calculate ChargeNeeded based on NextVehicleUse
     Charge up to ChargeNeeded
     Estimate Next HeatOrCoolService based on
         Temp AND NextVehicleUse
     PickElectricalService based on HPCA
     Handshake Communication with GridOperator 35    LOOP BEGIN
        If AnyFault = yes
        THEN RespondToFault
        ELSE
          IF PowerFailure
            AND EmergencyPowerAuthorized
            AND BuildingAntiIslandingOK
               THEN ProvideEmergencyPower
          ELSE
            IF GridOperatorRequest
            AND NOT AlwaysMaximizeRange
               THEN ProvideGridServices 36    LOOP EXIT UPON AnyFault or NeedToCharge 37  IF AnyFault   THEN SignalFault and AwaitOperatorReset
                  ELSE ChargeOnly UNTIL ReadyToDrive

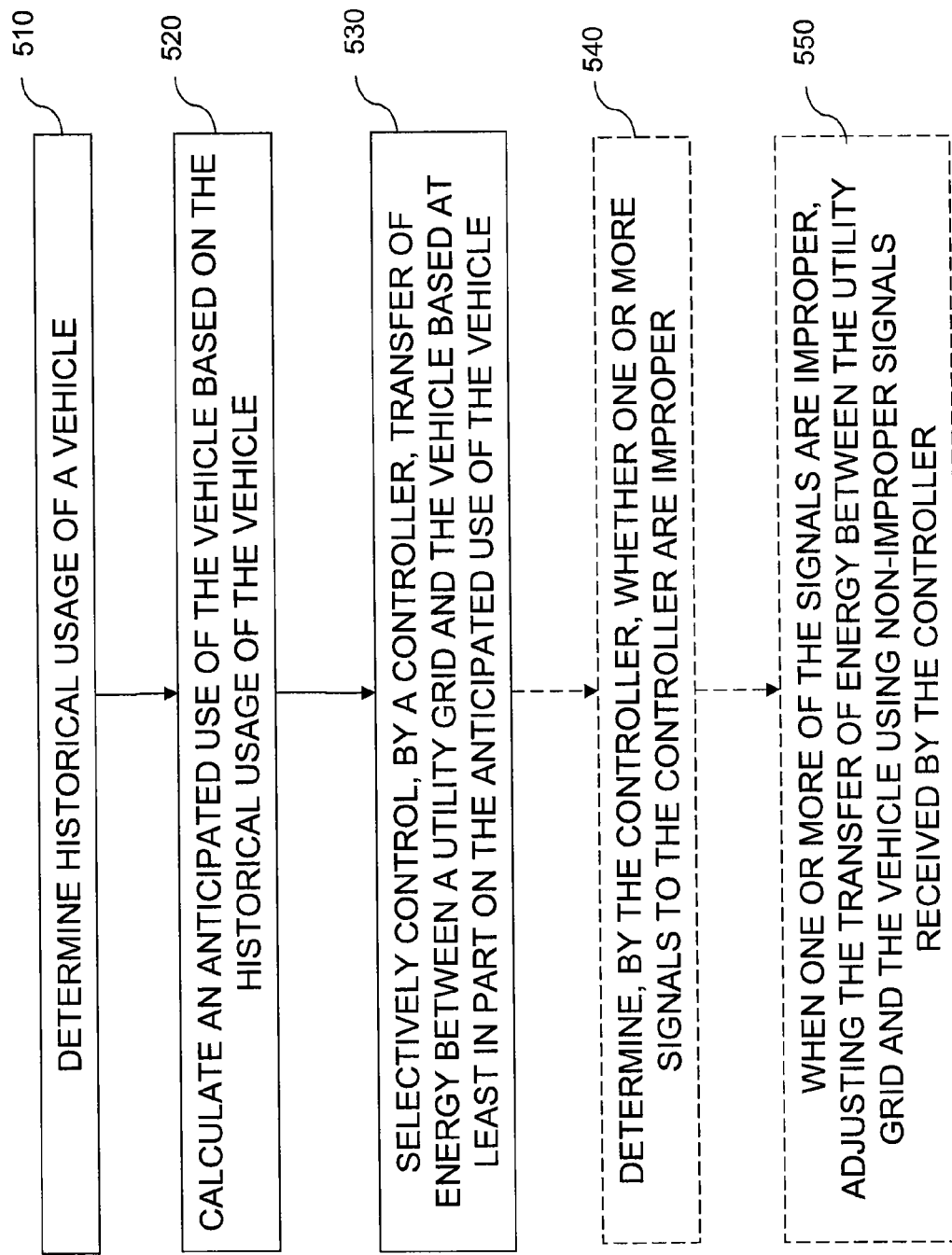

METHODS AND APPARATUS USING HIERARCHICAL PRIORITY AND CONTROL ALGORITHMS FOR GRID-INTEGRATED VEHICLES

CROSS-REFERENCE TO RELATED APPLICATIONS

This application claims the benefit of U.S. Provisional Application No. 61/033,116, filed Mar. 3, 2008, the contents of which are herein incorporated by reference.

FIELD OF THE INVENTION

The present invention relates to vehicles and other energy storage devices and, more particularly, to methods and systems to control power flow to and/or from vehicles (and other energy storage devices) that are connected to the electric power grid.

BACKGROUND OF THE INVENTION

The conventional control practice for an electric vehicle run from batteries or a "plug-in hybrid" vehicle has been similar to those of other battery-operated mobile devices. That is, the operator may plug the device into an electrical outlet connected to a utility's electrical power grid ("electric power grid") and the device's charger immediately charges it at the maximum rate consistent with care of the batteries. The charge rate may simply be a result of the current limit on the charger electronics and the varying internal resistance of the battery without adding components for charge rate control. Alternatively, the charger may contain explicit logic or components to take best care of the battery. In either case, the status and needs of the electric power grid are not considered.

SUMMARY OF THE INVENTION

This invention is embodied in methods and apparatus to control power flow to and/or from vehicles (and other energy storage devices) that are connected to the electric power grid while stationary.

This invention is also embodied in methods and apparatus to control power flow between vehicles and the electric power grid so as to make these electrical flows beneficial to the electric power grid and the vehicles.

This invention is further embodied in methods and apparatus for managing system energy flow. The apparatus includes an energy storage unit to store energy to be used by a system and a power conversion unit configured to be coupled between the energy storage unit and a utility grid. The apparatus also includes a controller to selectively control the power conversion unit to transfer energy between the utility grid and the energy storage unit based at least in part on an anticipated use of the system.

BRIEF DESCRIPTION OF THE DRAWINGS

The invention is best understood from the following detailed description in connection with the accompanying drawings, with like elements having the same reference numerals. According to common practice, the various features of the drawings are not drawn to scale. On the contrary, the dimensions of various features are arbitrarily expanded or reduced for clarity. Included in the drawings are the following figures:

FIG. 3 is a block diagram illustrating portions of the control system including inputs and control elements of FIG. 2;

FIGS. 4A and 4B are tables illustrating data structures for an HPCA system that includes an adaptation module in accordance with yet another exemplary embodiment of the invention;

FIG. 4C is a listing illustrating a representative algorithm for an HPCA system in accordance with yet another exemplary embodiment of the invention; and FIG. 5 is a flow chart illustrating a method of managing system energy flow in accordance with yet another exemplary embodiment of the invention.

DETAILED DESCRIPTION OF THE INVENTION

Exemplary embodiments of the present invention may be used to control the transfer (e.g., storage or release) of energy from an energy storage device.

As used herein, the term vehicle generally refers to a mobile machine for carrying passengers, cargo, or equipment. This includes passenger automobiles, passenger buses, cargo trucks, service trucks carrying equipment (lift buckets, tools, and drilling rigs, among others), aircraft, ships, limited-area vehicles such as forklifts in warehouses or baggage and fuel handling service vehicles in airports or ports, and any other vehicle which operates autonomously and, thus, carries its own energy storage unit and power conversion unit. Vehicles connected to the grid while stationary may have an internal energy storage system (such as batteries, capacitors, flywheels, distillate petroleum products, hydrogen, electrochemical and/or other storage). Exemplary alternative embodiments of the invention relate to grid-connected vehicles which are plugged in only to provide power to the grid, for example, a vehicle refilled with liquid or gaseous fuel, which converts that fuel to electricity and provides power to the grid but may not recharge from the grid.

As used herein, the term "electric power grid" (herein "utility grid") is generally used to refer to the electrical power system extending from power generation plants to electrical outlets (or vehicle connections). This includes generators, transmission and distribution lines, and the wiring at the "site" where a vehicle may be attached to an electrical outlet via a plug, for example. The site may include a residential or commercial building, parking lot or other parking location.

It is contemplated that the vehicle's electrical system may satisfy one or more functions for the utility grid including, for example, regulation functions, emergency backup functions, and/or reactive power control functions, among others.

Figure 1A:
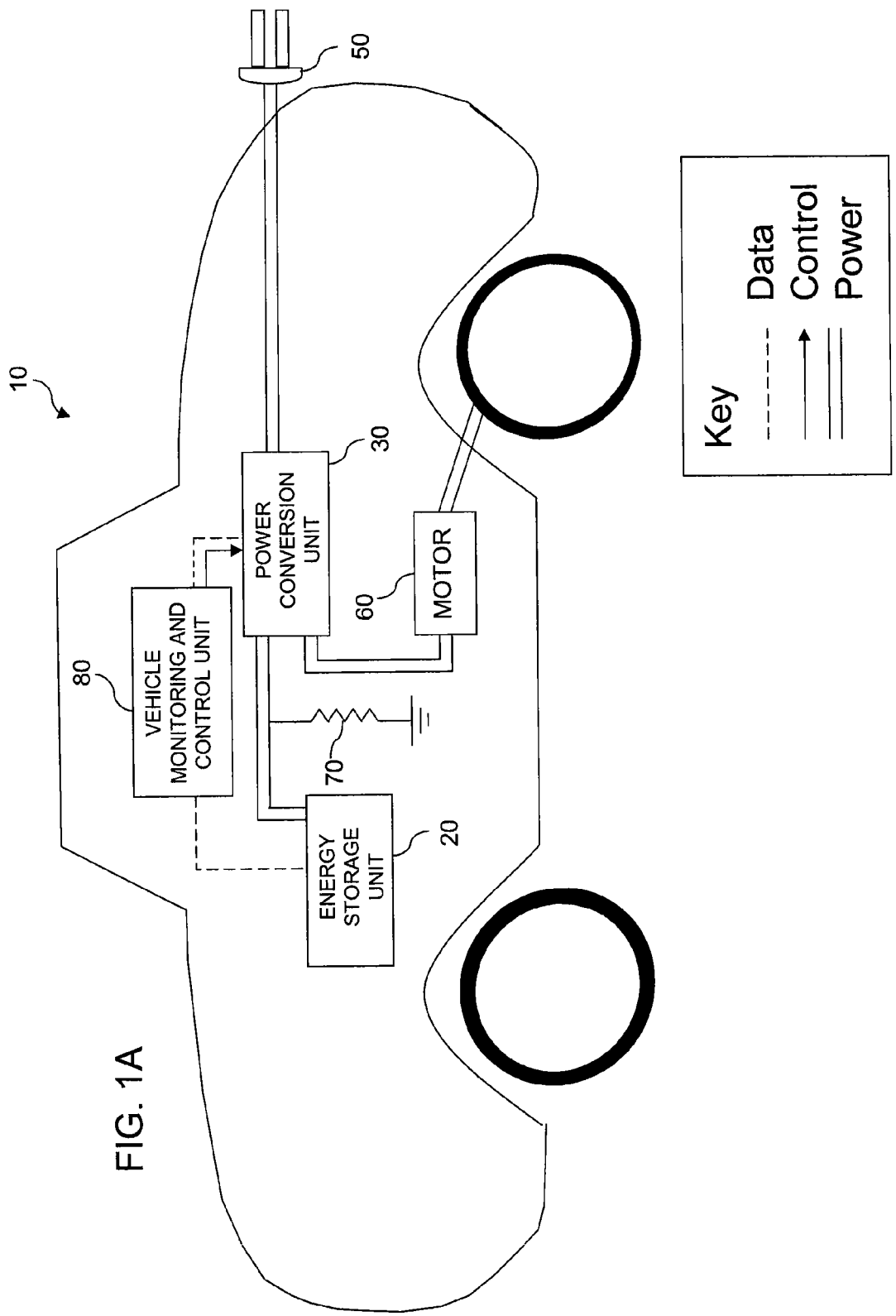
FIG. 1A is a schematic drawing illustrating a vehicle with a vehicle monitoring and control unit in accordance with an exemplary embodiment of the invention.
Figure 1B:
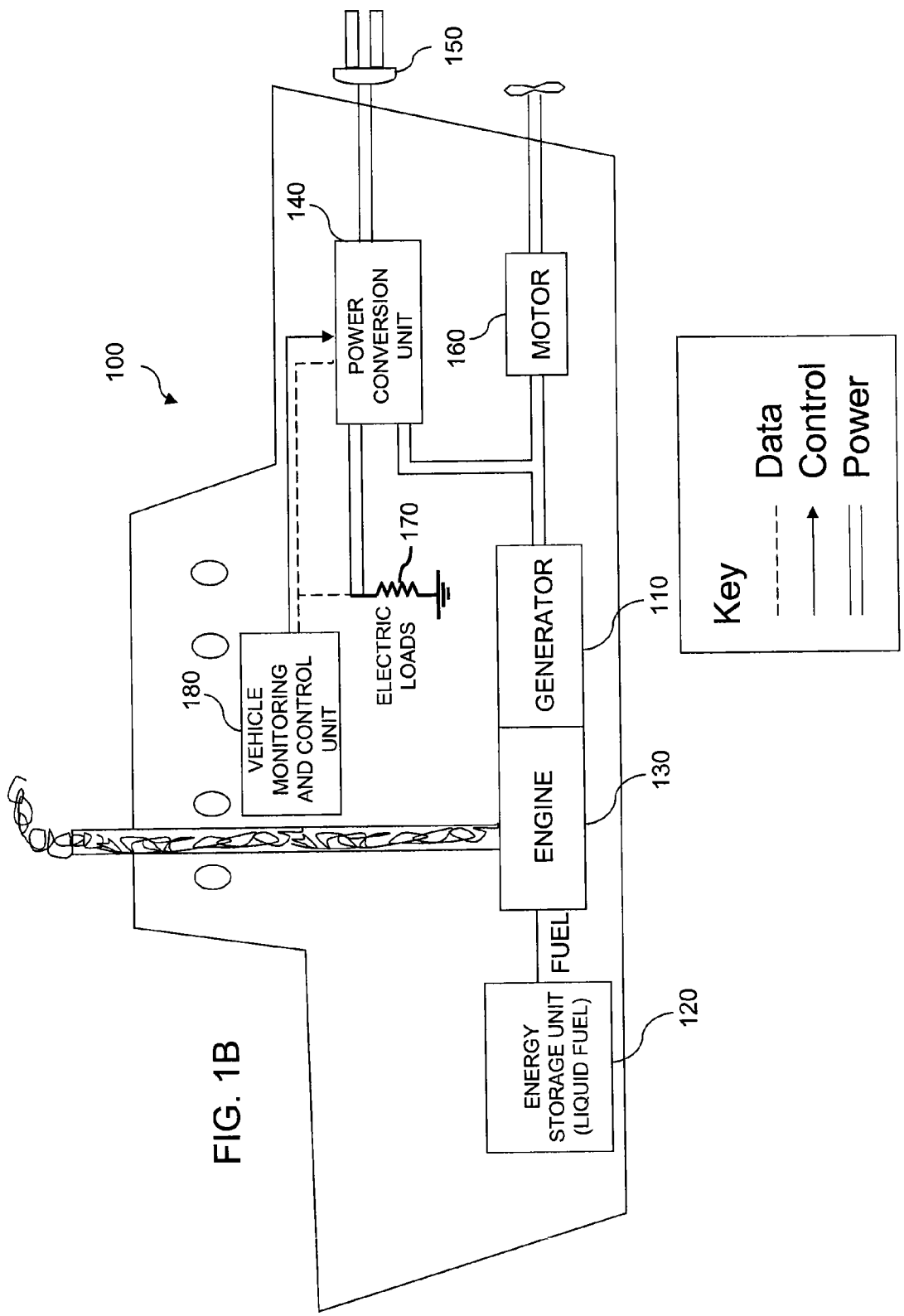
FIG. 1B is a schematic drawing illustrating another vehicle with a vehicle monitoring and control unit in accordance with another exemplary embodiment of the invention.
Figure 2:
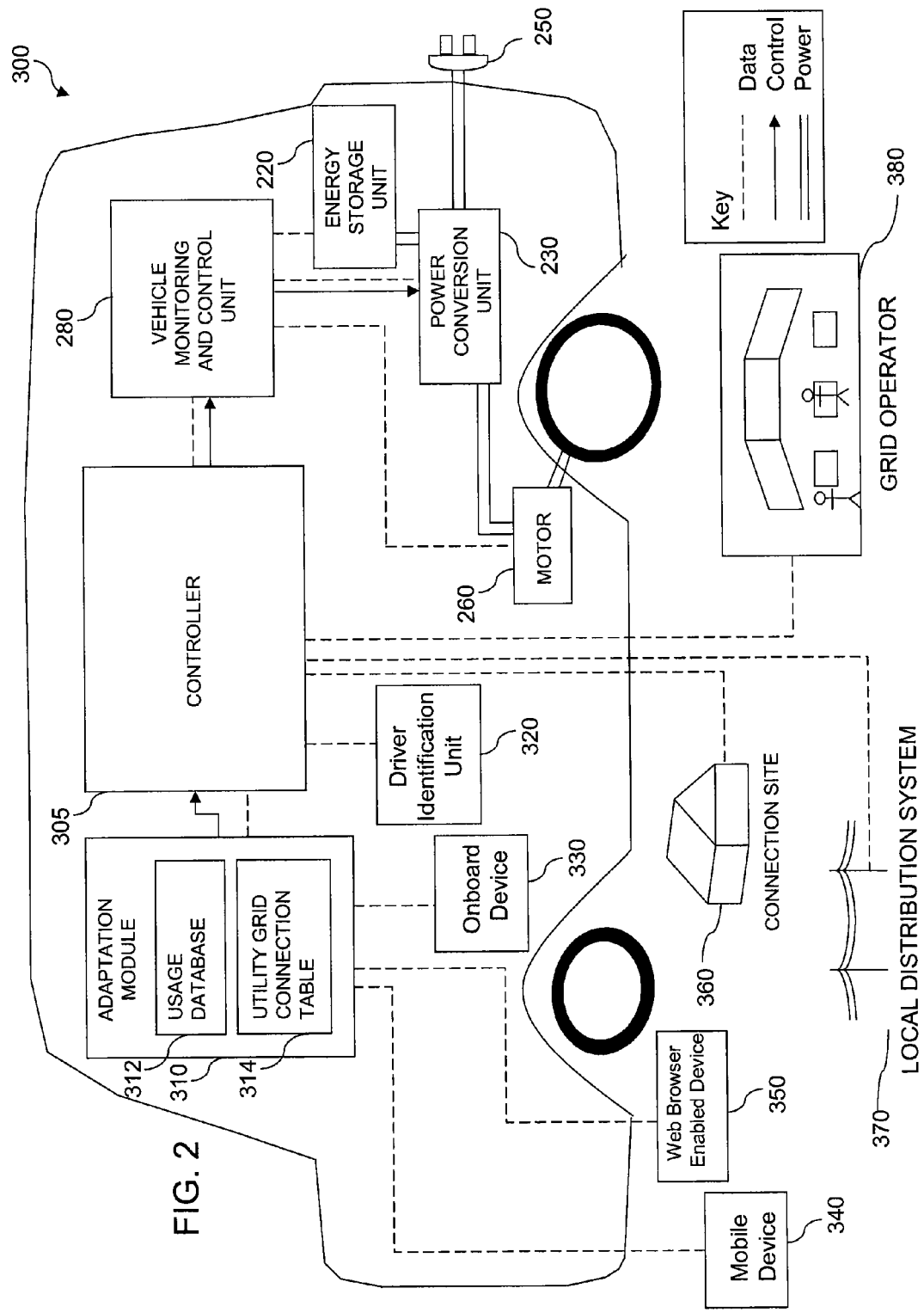
FIG. 2 is a schematic diagram illustrating a further vehicle with a Hierarchical Priority and Control Algorithm (HPCA) system including sensor, control, and logic elements in accordance with yet another exemplary embodiment of the invention.

In FIGS. 1A, 1B, and 2, data transfers are represented by dashed lines, power transfers are represented by double lines and control processes are represented by lines with arrows.

FIG. 1A is a schematic drawing illustrating a vehicle 10 with a vehicle monitoring and control unit 80 in accordance with an exemplary embodiment of the invention.

Referring to FIG. 1A, vehicle 10 may include an energy storage unit 20, a power conversion unit 30, a power connection 50, a motor 60, a internal electric load 70 and vehicle monitoring and control unit 80. Vehicle monitoring and control unit 80 may be integrated into vehicle 10 or may be retrofit thereto. Energy storage unit 20, illustrated internal to vehicle 10, may store energy from a utility grid (not shown) via power connection 50 and may release stored energy to the utility grid via power connection 50.

Energy storage unit 20 may be: (1) a battery or battery pack for storing energy in a form of electrical energy; or (2) a capacitor unit for storing energy in a form of electrical energy. In these embodiments, power conversion unit 30 may convert utility grid power (e.g., alternating current power) into direct current power to charge the battery, the battery pack or the capacitor unit.

Alternatively, energy storage unit 20 may be: (1) a mechanical unit for storing energy in a form of inertia, (2) a fuel storage unit for storing energy via a chemical reaction; (3) the fuel storage unit for storing energy via an electrochemical reaction; or (4) the fuel storage unit externally recharged with a fuel. In these alternative embodiments, power conversion unit 30 may be: (1) a mechanical unit which uses power from the utility grid to accelerate a mass (e.g., flywheel) to store energy in the form of inertia; or (2) a fuel generation unit to generate additional fuel by the chemical reaction or electrochemical reaction.

Although the conversion process has been described as a one-way process to store energy into energy storage unit 20, one of skill understands that the process may also be reversed to convert power from energy storage unit 20 for release to the utility grid.

It is also contemplated that energy storage unit 20 may receive energy for storage from other sources and may release the energy to the utility grid via power conversion unit 30. For example, energy storage unit 20 may use liquid fuel, and the conversion to electrical power may be a one-way process from the fuel storage unit to the utility grid.

Motor 60 may convert electrical power into mechanical power to propel vehicle 10. Internal loads 70 (for example, heaters, lights, power equipment and/or communications, among others) may be supplied power via either energy storage unit 20 and/or power conversion unit 30. When attached to the utility grid, internal loads 70 may be supplied via power conversion unit 30 from the utility grid or energy storage unit 20 and when detached from the utility grid, internal loads 70 may be supplied via energy storage unit 20.

Vehicle monitoring and control unit 80 may provide data monitoring of vehicle systems such as energy storage unit 20 and power conversion unit 30, among others, and may control operations of vehicle 10 including, for example, power conversion unit 30 and internal loads 70 (e.g., power consumption of these loads).

In various exemplary embodiments, vehicle monitoring and control unit 80 may determine an anticipated use of vehicle 10 based on actual use patterns of vehicle 10 and/or input from the driver of vehicle 10, and may control power conversion unit 30 to transfer (to store or to release) energy between the utility grid and energy storage unit based at least in part on the anticipated use of vehicle 10. For example, monitoring and control unit 80 may adjust one or more of: (1) a direction of the transfer of the energy; (2) a rate of the transfer of the energy; or (3) a timing of the transfer of the energy.

It is contemplated that the utility grid may include vehicle grid connections at different parking locations such that vehicle 10 is connectable via power connection 50 at these locations for transfer of power between the utility grid and vehicle 10.

FIG. 1B is a schematic drawing illustrating another vehicle 100 with a vehicle monitoring and control unit 180 in accordance with another exemplary embodiment of the invention.

Referring to FIG. 1B, vehicle 100 may be, for example, a ship and may include a generator 110, an energy storage unit 120, an engine 130, a power conversion unit 140, a power connection 150, a motor 160, an internal electric load 170, and vehicle monitoring and control unit 180. Vehicle monitoring and control unit 180 may be integrated into vehicle 100 or may be retrofit thereto. Engine 130 may receive fuel from energy storage unit 120 to generate mechanical movement. Engine 130 may be coupled to generator 110 to cause generator 110 to generator electrical power for motor 160. Motor 160 may convert the electrical power generated into mechanical power to rotate a propeller.

When vehicle 100 is attached to the utility grid, electric power generated by generator 110 (e.g., that may be in excess of the electric power used by vehicle 100, for example to drive motor 160 and/or to supply power to electric loads 170) may be transferred to the utility grid via power conversion unit 140 and power connection 150. Alternatively, when vehicle 100 is attached to the utility grid, electric power (e.g., that may be used by vehicle 100 to drive motor 160 and/or to supply power to electric loads 170) from the utility grid may be transferred from the utility grid via power connection 150 and power conversion unit 140.

Internal loads 170 (for example, heaters, lights, pumps, power equipment and/or communications, among others) may be supplied power via power conversion unit 140. When attached to the utility grid, internal loads 170 may be supplied power via power conversion unit 140 from the utility grid or generator 110 and when detached from the utility grid, internal loads 170 may be supplied via generator 110.

Vehicle monitoring and control unit 180 may provide data monitoring, for example, of vehicle systems, such as electric loads 170 and power conversion unit 140, among others, and may control operations of vehicle 100 including, for example, power conversion unit 140. Vehicle monitoring and control unit 180 may selectively control the transfer of energy between the utility grid and vehicle 100 in accordance with anticipated use of vehicle 100. Additionally, vehicle monitoring and control unit 180 may implement one or more aspects of the hierarchically prioritized rules and graceful degradation rules (described below).

FIG. 2 is a schematic diagram illustrating a further vehicle 300 with a Hierarchical Priority and Control Algorithm (HPCA) system including sensor, control, and logic elements in accordance with yet another exemplary embodiment of the invention. FIG. 3 is a block diagram illustrating portions of the HPCA control system including inputs and control element within vehicle 300 of FIG. 2.

Referring now to FIGS. 2 and 3, vehicle 300 may include an energy storage unit 220, a power conversion unit 230, a power connection 250, a motor 260, a vehicle monitoring and control unit 280, a controller 305, an adaptation module 310 including a usage database 312 and a utility grid connection table 314, a driver identification unit 320, and an onboard device 330. Vehicle 300 may interface with (e.g., transfer data with) a mobile device 340, a web browser enabled device 350, a connection site 360, a local distribution system 370 and a grid operator 380.

Energy storage unit 220 may store energy from the utility grid via power connection 250 and power conversion unit 230 and may release stored energy to the utility grid via power conversion unit 230 and power connection 250. Energy storage unit 220 may also store energy from other sources. Motor 260 may use electrical or mechanical power converted by power conversion unit 230 from energy storage unit 220 to propel vehicle 300.

Vehicle monitoring and control unit 280 may provide data monitoring, of vehicle systems, such as energy storage unit 220, power conversion unit 230 and motor 260, among others. Additionally, vehicle monitoring and control unit 280 may control operations of vehicle 300 including, for example, power conversion unit 230.

When the energy storage unit 220 is a battery pack 440, the vehicle monitoring and control unit 280 may monitor, for example: (1) battery state-of-charge 282; (2) power to or from the battery 284; (3) battery temperature 286; and (4) passenger space temperature 288 (e.g., interior temperatures for vehicle 300). This monitored information may be provided as input data to controller 305. Based on the input data and the data structures in adaptation module 310, controller 305 may make decisions regarding, for example, charging/discharging of energy storage unit 220, and may send control signals via vehicle monitoring and control unit 280 to power conversion unit 230. Power conversion unit 230 may convert, for example, between alternating current power for the utility grid and direct current power for vehicle 300 under the control of vehicle monitoring and control unit 280. Controller 305 may also send control signals directly to the heating/cooling unit(s) for both the vehicle's interior 450 and for battery pack 440.

Adaptation module 310 may track operating schedule and driver inputs 400, and may assign a probability to future driver behavior for determining anticipated use of vehicle 300. Onboard device 330 may show the driver display information or queries from controller 305 or adaptation module 310 and may allow for driver inputs, for example, to respond to the queries. A mobile device 340 or a web browser enabled device 350 may also allow for driver inputs and queries via a global information network (e.g., the Internet), a cell phone or other communication infrastructure. Communications between onboard device 330, mobile device 340 or web browser enabled device 350 and controller 305 may be through adaptation module 310. It is contemplated, however, that such communications may be direct to the controller 305 or through another subsystem.

In certain exemplary embodiments, adaptation module 310 may not exercise control functions, and may function solely as a data collection and inference module.

Driver inputs 400 illustrated in FIG. 3 may be based on two-way communication with onboard device 330, mobile device 340 or web browser enabled device 350. For example, the driver may be queried for information, such as driver identification, an anticipated destination, an anticipated driving distance, an anticipated driving plan for a particular future time frame, or whether to apply a "default charge cycle" to vehicle 300 (in which vehicle 300 may be prohibited from supplying power to the utility grid and power may be provided from the utility grid to vehicle 300 based on time of day), among others.

Adaptation module 310 may track other inputs including last trip inputs 410 and current location inputs 420, originating from vehicle telemetry communication with the connection site 360. Last trip inputs 410 may include a current odometer reading 412 of vehicle 300, a current location 414 (e.g., a GPS location) of vehicle 300, a timestamp 416 represents the current date and time, and a current state-of-charge (e.g., level of storage) of energy storage unit 220. Last trip inputs 410 and current location inputs may be used to accumulate experience about the driver's trip needs, and about the electrical connections at the current parking location. Current location inputs may include plug amps/capacity 422 (e.g., the rated current or other electrical capacity measure of the grid-side power connection at the current parking location of vehicle 300) and meter number or other electrical account identifier 424 of the grid-side connection.

Driver inputs 400, last trip inputs 410 and current location inputs 420 may be processed by adaptation module 310 to track historical use data of vehicle 300 so that controller 305 may determine the anticipated use (future use) of vehicle 300 based on the historical use data.

Utility grid data 430 may be an input to controller 305. That is, sensor logic and communications from: (1) connection site 360; (2) local distribution system 370; and (3) grid operator 380 may be provided to controller 305 to determine, for example, ratings or operating restrictions of connection site 360, local distribution system 370, and grid operator 380. Connection site 360 generally refers to the location where vehicle 300 connects to the utility grid. Local distribution system generally refers to the electric power distribution system, including sub-transmission lines, substations, distribution feeders, distribution transformers and sensors and switches thereon, that provides electrical connection to the connection site 360. Grid operator 380 generally refers to the system (and personnel) that maintain a regional electric transmission system, by monitoring power transfers, and by controlling which electric generation plants and transmission lines operate to balance power on the utility grid. It may also refer to the systems and personnel that monitor and manage the local distribution system 370. Grid operator 380 may facilitate payments for grid services such as peak power, valley filling, regulation services, reserves, load shedding, and reactive compensation services, among others. Grid operator 380 may provide signals to grid-connected vehicles including dispatch, and receive signals regarding performance to compensate vehicle owners for grid services provided by these vehicles.

In some exemplary embodiments, the local distribution system 370 may provide signals indicating Kilovolt-ampere (kVA) limits of transformers and distribution lines, existing local open or faulted circuits, existing reactive power needs, existing temperatures of transformers and distribution lines, maximum transformer temperature rating and/or distribution feeder kVA rating, among others.

Adaptation module 310 may include: (1) usage database 312 to store historical use data of vehicle 300 indicating each use of vehicle 300 including information to estimate the energy consumed by vehicle 300 during each respective use according to the driver of vehicle 300; and (2) utility grid connection table 314 to store information about the availability and the capacity for connection of vehicle 300 to a utility grid location indicated by the historical use data. Adaptation module 310 may store historical use data for each respective driver.

In certain exemplary embodiments, adaptation module 310 may measure the historical usage of vehicle 300 and, via a learning machine, may learn and project an anticipated (most probable or likely) use profile of vehicle 300. The anticipated use profile generally refers to the anticipated use of vehicle 300 over a specified or predetermined time frame. The anticipated use profile may be in accordance with the measured historical use data stored in usage database 312 and driver inputs 400 provided by the driver.

The adaptation module may produce an estimated location of a vehicle for each time interval, to provide the most likely amount of electricity to be used in that interval, the location at which it would be used, along with a worst case for each interval and the associated probabilities.

Initially, (for example, when initiating a new vehicle, a new driver is added to an existing vehicle, or adaptation module memory is cleared), adaptation module 310 may identify the driver and may request explicit input of their projected use schedule (e.g. work commute times and distance) and "minimal range" (e.g., always leave 10 miles range to get to the local hospital or other important location).

For ongoing operation, as each driver uses vehicle 300, drives vehicle 300, and attaches vehicle 300 to the utility grid, adaptation module 310 may track this usage and may record it as part of a use profile. From individual trips, a data structure may be accumulated (built up) of expected driving use and plug availability for each time of day. This accumulation of expected driving by adaptation module 310 may also be referred to as "machine learning". Adaptation module 310 may communicate to controller 305, in accordance with Priority 5 (see description of hierarchical priority below), i.e., the anticipated driver needs. Over time, adaptation module's experience with vehicle use (the use profile) may be allowed to override the driver's explicit input of a projected use schedule. In certain embodiments, adaptation module 310 may not be allowed to override the driver's input "minimal range."

Adaptation module information may also be used for additional services not directly related to grid management. For example, in high or extreme temperatures, adaptation module's prediction of when vehicle 300 is to be driven may be used to preheat or precool the passenger compartment prior to operation, for improved driver comfort. Thus, the initial power for thermal conditioning may be supplied from the utility grid rather than energy storage unit 220.

Adaptation module 310 may identify particular driving trips which deviate from normal driving patterns (e.g., patterns which repeat at regular intervals, such as trips to work, to school, or to visit a relative, among others). This determination may occur automatically and/or may be based at least in part on driver input. Adaptation module may determine whether a particular trip represents a normal driving pattern by comparing the particular trip to historical use data. If the particular trip does not correlate to other trips in the historical use data (e.g., if the correlation between the particular trip and trips in the historical use data is not above a threshold amount), the adaptation module may identify the trip as a non-normal trip. Adaptation module 310 may then remove the particular trip from consideration when calculating anticipated use. Adaptation module may seek confirmation from the driver prior to removing the particular trip from consideration.

Adaptation module 310 may be configured to accept driver input that a non-normal trip is to occur in a particular time frame so that controller 305 may control transfer of energy to energy storage unit 320 appropriately. For example, an "always maximize range" button may be provided and when activated, adaptation module 310 would maximize storage in energy storage unit 320 to prepare for a non-normal or long trip in the near future.

In various exemplary embodiments, adaptation module 310 may determine whether a driver of vehicle 300 has changed based on a determination that the historical use profile of vehicle 300 deviates from an actual (current) use profile of vehicle 300 by more than a threshold amount. If the driver of vehicle 300 has changed, adaptation module 310 may select a first control mode in which the driver is periodically queried for confirmation of vehicle destinations; and if the driver of vehicle 300 has not changed, adaptation module 310 may select a second control mode in which energy storage by energy storage unit 220 may increase relative to when the historical use profile deviates from the actual use profile of vehicle 300 by less than the threshold amount. If adaptation module 310 selects the first control mode, controller 305 may enter into a learning mode to collect information for re-evaluating driving patterns and vehicle operations of the changed driver.

Controller 305 may include or be integrated with adaptation module 310. Adaptation module 310 may automatically learn the use patterns of one or more drivers of the vehicle over time. Adaptation module 310 may observe the vehicle use patterns, including the time and distance of each trip, and plug availability when parked. The model developed by adaptation module 310 may be used to make predictions about times when more charge may be needed, thus providing knowledge to controller 305 of charge levels for predicted driving at each time of day.

Controller 305 may also receives an anticipated use profile signal corresponding to a respective driver identified by driver identification unit 320, as an output from adaptation module 310. A driver identification unit 320 may identify the driver of vehicle 300 to controller 305 and via controller 305 to adaptation module 310 based on secure passwords, smartcards, smart keys, and/or biometric information from weight or scans, among others.

In certain exemplary embodiments, controller 305 may selectively control power conversion unit 230 to transfer energy based on the determined anticipated use profile and/or a signal indicative of a current value (e.g., monetary value) of the energy. For example, controller 305 may: (1) calculate a level of energy for storage in energy storage unit 220 during an anticipated time frame based on the anticipated use profile; and (2) control power conversion unit 230 to transfer energy from energy storage unit 220 or transfer energy to energy storage unit 220 based on at least a current level of energy stored in energy storage unit 220 and the calculated level of energy.

In various exemplary embodiments, controller 305 may selectively control the transfer of energy between the utility grid and energy storage unit 220 in accordance with a set of hierarchically prioritized rules based at least in part on: (1) input signals to controller 305 indicating operating characteristics of vehicle 300; and (2) an anticipated use signal to controller 305 based on the anticipated use of vehicle 300. The set of hierarchically prioritized rules may be further based on one or more revenue/cost signals to controller 305 indicating estimated revenues/costs to transfer energy between the utility grid and energy storage unit 220. Exemplary, hierarchically prioritized rules are set forth below. Controller 305 may additionally selectively control transfer of energy in accordance with graceful degradation. Certain exemplary embodiments illustrated above include multiple levels of "graceful degradation" that provide for improved or optimum use of remaining resources in an event of a failure of a subsystem or faulted input, for example. Exemplary graceful degradation rules are also set forth below.

It is contemplated that controller 305 may adjust (1) a direction of transfer of energy; (2) a rate of transfer of energy; and/or (3) a timing of transfer of energy.

A portion of the computing and data management of the HPCA system may be completed external to vehicle 300. In some exemplary embodiments, computing and data management may be completed exclusively while vehicle 300 is grid-connected such that energy used by the computing and data management operations may be supplied from the utility grid.

Controller 305, adaptation module 310, and vehicle monitoring and control unit 280 may be implemented on separate computer platforms (or processors) or may be integrated onto a single computing platform (or processor). Usage database 312 and utility grid connection table 314 may be implemented on a database server, a storage device on the vehicles, and/or in other locations.

In various exemplary embodiments, controller 305 may determine that at least one input signal (282, 284, 286, 288, 360, 370, 380, and/or the anticipated use profile signal) for reception by controller 305 is improper (i.e., defective, faulted or not received). Responsive to controller 305 determining that at least one signal is improper, controller 305 may adjust or reduce the transfer of energy between the utility grid and energy storage unit 220 based on secondary information derived from other input signals signal (282, 284, 286, 288, 360, 370, 380, and/or the anticipated use profile signal) received by controller 305 that are proper.

Controller 305 may receive a grid control signal from grid operator 380 indicating one or more values (e.g., the current system need for power) associated with (1) the transfer of energy between the utility grid and energy storage unit 220 or (2) the storage capacity of energy storage unit 220. When the grid control signal is defective or missing, controller 305 may control the transfer of energy using a local detection of grid power characteristics (e.g., frequency control and/or reactive power, among others, may be provided based on a local detection of grid power characteristics) at connection site 360.

When the historical use data (e.g., driver characteristics or preferences), stored in usage database 312 is not available (for example, due to the vehicle being new, the driver not having inputted any preferences, and/or a adaptation module failure), controller 305 may control transfer of energy between the utility grid and energy storage unit 220 based on a default charging cycle that enables maximum range for vehicle 300 at a predetermined time of day.

Certain exemplary embodiments illustrate multiple levels of "graceful degradation". For example, when there is a failure of external systems, sensors, or the operator, controller 305 may provide for the best use of remaining resources. Graceful degradation may allow controller 305 to achieve additional market value or functionality when some inputs (driver inputs 400, last trip inputs 410, current location inputs 420, vehicle monitoring and control unit inputs 282, 284, 286 and 288 and/or utility grid data inputs 430, among others) or systems (adaptation module 310, among others) are broken or compromised. For example, if one input signal is lost, a second, less precise input may be used to achieve the same or similar function. Similarly, if a signal necessary for a high-value electrical service is disconnected, controller 305 may provide an electrical service of a lower value, an exemplary instance being a correction of local reactive power. Additional examples of graceful degradation are set forth below.

FIGS. 4A and 4B are exemplary tables within usage database 312 and utility grid connection table 314, respectively, illustrating data structures for an HPCA system that includes an adaptation module in accordance with yet another exemplary embodiment of the invention.

Referring to FIG. 4A, adaptation module 310 may construct internal data structures of likely (most probable) trips and plug capabilities of known trip origin and destination points for each driver. This information regarding the driver and his or her schedule may be stored in usage database 312 and utility grid connection table 314. This driving and plug information may be used to predict trips and charging opportunity windows. Adaptation module 310 may include in usage database 312: (1) a driver ID associated with each driver stored in the usage database 312; (2) the number of days that historical use data has been measured for a specified driver in usage database 312; (3) the minimum range that vehicle 300 should be capable of driving (e.g., corresponding to the minimum capacity energy storage unit 220 is allowed to be discharged); (4) a set of records indicating: (i) several of the more likely (e.g., anticipated) locations for vehicle 300 over each specify timeframe and the corresponding anticipated energy requirements for vehicle 300, such as 24, 48 or 72 hours, among others; (ii) the electrical capacity of the corresponding grid-side connection (plug) at each anticipated location; and (iii) the probability that vehicle 300 will be at the location at the particular time frame. For example, there is a very high probability (100%) that at 4:00 a.m. vehicle 300 will be parked at home. Vehicle 300, however, only has a 40% probability of being parked at home at 6:00 a.m. The probabilities may be based on the percentage of times over an extended period that vehicle 300 is at a location at a particular time of the day.

Referring now to FIG. 4B, utility grid connection table (Plug Table) 314 may store locations of electrical outlets (plug locations) known to vehicle 300. Plug Table 314 can be a separate table or combined with usage database (Driver Table) 312 and may include each plug's electrical characteristics (e.g., plug capacity), meter number, GPS location, billing information, and the probability of being able to access a plug in the identified location.

FIG. 4C is a listing illustrating a representative algorithm for an HPCA system in accordance with yet another exemplary embodiment of the invention.

Referring to FIG. 4C, the algorithm listing is provided in pseudocode using descriptive names for subroutines or functions, such as "SetDriverTable". The first section of the algorithm is Initial Setup 30, which waits for an identification of an individual driver (via key, access code, or biometrics) from driver identification unit 320 and if adaptation module 310 can not identify the driver, the driver may be queried as to the expected typical driving schedule. If the driver answers, the expectations may be entered into Driver Table 312. If the driver refuses to answer or aborts the process, a "night charge default" may be set for night charging of vehicle 300 such that vehicle 300 is fully charged at a predetermined time, such as early morning. Alternatively, a "default charging cycle" may be set to generate a full charge for vehicle 300 during the day or whenever plugged in (attached) to the utility grid. In Ongoing Operation 31 of vehicle 300, the code execution flow may be controlled by an Event Loop 32, with sections of code activated for different events including, for example: (1) unplugging (detaching) 33 vehicle 300 from the utility grid; and (2) plugging (attaching) 34 vehicle 300 into the utility grid. During the interval that vehicle 300 is plugged into the utility grid, several initial operations may be performed, then a repeating inner loop 35 may determine whether faulted, defective or improper inputs exist, when to sell grid services and which types of grid services to sell, among other decisions. The loop exit 36 from this plugged-in loop may occur when there is an electrical problem or when controller 305 determines that it is now time for vehicle 300 to be charged. Specific processing may occur if the loop exit 36 is due to an electrical fault. Otherwise, processing may proceed to charging 37.

To facilitate description, methods will be described with reference to vehicles and apparatus of FIGS. 1A, 1B, 2, 3, 4A, 4B and 4C. It will be understood to one of skill in the art from the description herein that the present invention may be used with other vehicles, and that one or more of the steps may be omitted without departing from the spirit and scope of the invention.

FIG. 5 is a flow chart illustrating a method of managing vehicle energy flow in accordance with yet another exemplary embodiment of the invention.

Referring to FIG. 5, at block 510, historical usage of a vehicle 10, 100 or 300 is determined. At block 520, an anticipated use of vehicle 10, 100 or 300 is calculated based on the historical usage of vehicle 10, 100 and 300. At block 530, vehicle monitoring and control unit 80, or 180 or controller 305 may selectively control transfer of energy between the utility grid and vehicle 10, 100 or 300 based at least in part on the anticipated use of vehicle 10, 100 and 300. At optional block 540, vehicle monitoring and control unit 80 or 180 or controller 305 may determine whether one or more signals thereto are improper. At optional block 550, when one or more of the signals are improper, power conversion unit 30, 130 or 230, may under the control of vehicle monitoring and control unit 80 or 180 (FIGS. 1A and 1B) or controller 305 (FIG. 2), may adjust the transfer of energy between the utility grid and vehicle 10, 100 or 300 using non-improper (proper) signals received by vehicle monitoring and control unit 80 or 180 or controller 305.

The determination of historical usage may include: (1) storing, in usage database 312, historical use data indicating each respective use of vehicle 300 including information for estimating the energy consumed by vehicle 300 during each respective use according to each driver of vehicle 300; and (2) storing, in utility grid connection table 314, information about the availability and the capacity for connection of vehicle 300 to the utility grid at locations indicated by the historical use data.

Controller 305 may selectively control transfer of energy between vehicle power connection 250 and energy storage unit 220 based on at least the anticipated use profile of vehicle 300. Adaptation module 310 may determine a most likely use profile for vehicle 300 based on the historical use data stored in usage database 312. Controller 305 may provide selective control by: (1) calculating a level of energy predicted to be drawn from the energy storage unit during an anticipated time frame based on the use profile; and (2) controlling a release of energy from energy storage unit 220 based on at least a current level of energy stored in energy storage unit 220 and the calculated level of the energy needed.

Controller 305 may selectively control energy transfer between the utility grid and vehicle 300 in accordance with a set of hierarchically prioritized rules based at least in part on: (1) input signals to controller 305 indicating operating characteristics of vehicle 300; and (2) an anticipated use signal to controller 305 indicating the anticipated use of vehicle 300.

Controller 305 may communicate a service offering from vehicle 300 to grid operator 380 including, for example: (1) a regulation-down service; (2) regulation-up service, (3) a reserve service such as spinning reserves; (4) a valley filling service; (5) a reactive power service; (6) a peaking service; or (7) an emergency backup service.

In certain exemplary embodiments, controller 305 may determine whether one or more of the signals from adaption module 310, vehicle monitoring and control unit 280 and other grid signals 360, 370 and 380 are either not being received by the controller 305 or are defective signals (i.e., are improper). When a signal to controller 305 is determined to be defective or improper, or when a failure has occurred on the local electrical system (e.g., a fault or open circuit), controller 305 may adjust or reduce (e.g., scale back) or may halt the transfer (release or storage) of energy from or to vehicle 300, or it may shift to control of energy to or from the vehicles based on different, for example, less precise, inputs. This is one exemplary embodiment of graceful degradation. Other exemplary embodiments of graceful degradation are set forth below.

Hierarchically Prioritized Rules

Additional information regarding the set of hierarchically prioritized rules is set forth below.

The hierarchically prioritized rules may be implemented as an algorithm such as the HPCA operating on one or more computers, on and/or off the system (or vehicle). They may sense multiple inputs, may learn about driving use via the adaptation module, and may make decisions about the electrical current, reactive power, and timing of charging and/or discharging of the system (or vehicle). These decisions may be made to control electrical flows for the benefit of both the electric utility grid and the vehicle owner and/or driver.

Whether on or off the vehicle, the optimization algorithm may rely on various external systems, sensors and controls (for example, the algorithms may include as inputs sensed electrical power from the grid, communication connections to the utility grid operator, to the local distribution system and to monitored devices), and to the adaptation module. Because multiple inputs are utilized, and the vehicle desirably provides safe operation even if external systems fail, multiple types of graceful degradation (described below) may be included to increase safety and reliability and to provide modes that "make the best of circumstances" by continuing to provide functionality and value even in the event of external or subsystem failures.

The "hierarchical priority" may be used to evaluate one of several modes or services of the grid-connected vehicle, and may determine which of those possible modes or services is to be performed. In certain embodiments, the decision of which modes or services to be used is based on a set of hierarchically prioritized rules and may include the following rules and priority order:

Priority 1. "Anti-islanding," refers to not energizing the local electrical system when the power is inactive and a maintenance worker may expect local power wires to not be energized (i.e., a local grid fault interrupt is sensed). That is, if a fault is detected in the local distribution grid, power may not be sent from the vehicle to the grid.

Priority 2. Protection of vehicle components refers to protection of power electronics, the battery, a fuel cell, a generator, and other similar equipment of the vehicle. For example, excessive charge or discharge and temperatures above or below specified limits may degrade a battery, reducing battery life.

Priority 3. Emergency power need from the building operator refers to vehicles that may produce power for a local building or local grid, if compatible with Priorities 1 and 2 above.

Priority 4. Honoring a signal from the driver that range is to be maximized at the current time refers to in one embodiment, an "always maximize range" button that may be used by the driver/owner to give priority to charging the battery over other functions and values.

Priority 5. Anticipated driver needs refers to a computerized tracking system that may learn driving patterns of the vehicle operator(s), and the operator(s) may additionally enter desired parameters which may be used to generate a historical use profile.

Priority 6. The economic value of charge, discharge, storage reserve, reactive power, and/or reliability to the grid including the building operator, relative to the costs of providing these services from the vehicle refers to, for example, relative cost of charging power for a battery pack, e.g., due to off-peak rates and/or the ability to use operator-owned resources such as building solar to charge the vehicle. It may also include the comparison of alternative power markets so that the vehicle may choose one of, for example, the spinning reserve market versus the frequency regulation market.

Priority 7. Social benefits which are not commoditized. This refers to among others pollution reduction and provision of backup power for renewable energy. If these are provided by markets, they may be included in priority (6). If not, and if there is any cost to providing them, the vehicle operator/owner may opt to provide them or not, based on personal, organizational or social values.

The hierarchical priority order algorithms may allow reordering of priority order of Priorities 1 to 7 under certain conditions and may also be established based on a different priority order of these priorities in other exemplary embodiments. For example, in the event of a medical emergency during a power outage, Priority 3 may override Priority 2 allowing for continuation of life-support equipment even if it caused damage to the battery of a vehicle from excessive discharge. Similarly, Priority 4 may override Priorities 2 and 3 in cases where the driver may anticipate an unusual need for a full charge in the near future.

Graceful Degradation

The following are exemplary embodiments of graceful degradation.

a) Fault or Open on Power System.

If the vehicle is providing power to the grid and either a grid fault or loss of grid power is experienced, no more power is provided from the vehicle. This rule may apply regardless of the value (e.g., economic value) of that grid power from the vehicle. Such a rule may be implicit in Hierarchical Priority (1) having a higher priority than Hierarchical Priority (6). In the electric utility industry, this is typically called "anti-islanding".

b) No Grid Control Signal.

If the grid control signal or market signal is lost, the vehicle may provide authorized power services based on local detection (e.g., frequency control and reactive power may both be provided based on the local signal). This is a "degradation" in that the value of such power services is generally much lower, or may not be given any market value. This may be a substitute for service referred to in Hierarchical Priority (6) if this local response is commoditized, or may be a shift to Hierarchical Priority (7) otherwise.

c) No Adaptation Module Prediction.

If driver characteristics or preferences are not available (for example, due to the vehicle being new, the driver may not have inputted any preferences, and/or a memory unit failure may exist in the adaptation module), charge-discharge control may degrade to a "default charge cycle". When control is based on the default charge cycle, power may not be provided to the grid, and power is provided from the grid to the vehicle based on time of day. In one exemplary embodiment, "default charge cycle" might be stated in words as: Charging may not begin prior to 10 pm; charging may be accomplished from 10 pm to 6 am at a uniform power rate (i.e., below the maximum rate the car is capable of). A second exemplary "default charge cycle" might be stated in words as: During daytime (from 6 am to 10 pm), charging may not be done unless the storage is, for example, less than a predetermined threshold amount, for example, one-third full. These default charge cycles further specify degradations within, for example, Hierarchical Priority (5).

d) Adaptation Module Prediction Failure.

If the adaptation module predictions are so inaccurate (e.g., exceed a predetermined or calculated threshold or thresholds) that the entire adaptation module model may be in doubt, one or more graceful degradation modes may be selected as the operational mode. One of these modes may include an "abnormal use" mode as a graceful degradation mode 1, another one of these modes may include "another driver" mode as a graceful degradation mode 2.

If the vehicle usage (e.g., trips or travel patterns) is different from adaptation module predictions but no evidence that the driver is different, the operating mode may be selected as the graceful degradation mode 1 (i.e., abnormal use mode). This adaptation module mode may correspond to, for example, a vacation, an illness or a household demographic change such as a marriage, a child graduation, or a lost job. The abnormal use mode may greatly lower the confidence in predictions of the adaptation module for the driver and, thus, may lead to conservative power management. For example, the abnormal use mode: (1) may determine whether to enter an "early learning curve" mode to analyze driver, vehicle and travel pattern characteristics, among other, such that improved adaptation module predictions may be obtained; (2) may maintain a higher battery state-of-charge at certain times of the day or continuously than other adaptation module modes; and/or (3) may query the driver more frequently regarding the drivers planned vehicle usage or regarding confirmation of the adaptation module mode which the driver desires to be operational, i.e., whether to charge the energy storage unit, or to sell grid services at the present time. If trip patterns revert to the original adaptation module predicted patterns (e.g., at the end of a vacation), the adaptation module table entries may be restored when leaving the abnormal use mode. If biometric data or guest login, driver queries, GPS location data or other information available to the adaptation module indicates a new driver and the adaptation module predictions are incorrect (e.g., inaccurate), the adaptation module: (1) may set up a new entry in the driver table, (2) may query the driver more frequently, and/or (3) may enter the "early learning curve" mode. In this case, a driver ID may be used to index the prioritized driver's adaptation module model. This further specifies degradations within, for example, Hierarchical Priority (5).

Although modes 1 and 2 are described above, other modes are also contemplated such as a vacation mode, a secondary driver mode and a time of use mode (weekday or weekend mode), among others. Each of these modes would include corrective actions to improve the accurate of the adaptation module predictions.

e) Overload in Distribution System.

While providing grid services, or while charging, a part of the distribution system (for example, a distribution transformer, a distribution feeder, or substation equipment) may approach or exceeds a limit (for example, a limit on rated power or maximum temperature). In this event, graceful degradation may scale back power proportionally to reduce the limit to at or below its rating. This reduced power may be an amount scaled back for a period of time or may continuously change based on the measured quantity exceeding the limit. That is, rather than shutting off the grid services, the adaptation module may reduce the power from the vehicle or vehicles enough to keep under a rated maxima. In certain exemplary embodiments, such as with capacity markets, a report may be generated by the adaptation module with a lower capacity available rather than actually adjusting power flow directly. This type of graceful degradation (overload protection) may take priority over Hierarchical Priorities (3) through (7). This exemplary embodiment may relate to sensors from utility grid 360, 370 and 380 and controls 230, 280 and 305 shown in FIG. 2, and the logic 280, 360, 370 and 380 shown in FIG. 2.

f) Changing Numbers of Vehicles or Loads Nearby.

While providing grid services, or charging vehicles, if the number of vehicles on the local distribution system changes, the local distribution system may approach or exceed engineering or regulatory maxima. This may occur at any level of the distribution system (e.g., a substation, a distribution feeder, or a distribution transformer, among others), and may occur for different rated powers, temperatures, or other limits such as reactive power limits.

In one exemplary embodiment, a residential distribution transformer may have a rating limit of 25 kVA (for simplicity this is considered to be 25 kW) and may serve, for example, three houses. Assuming that: (1) the residential distribution transformer has a 25 kW rating; (2) all three houses have vehicles and vehicle plugs each capable of 15 kW power into the vehicle plug from the transformer or 15 kW power out of the vehicle plug to the transformer; and (3) the electric power distribution company decides to rely on HPCA to manage vehicle loads rather than increasing the rated kVA capacity of the distribution transformer, if the sum of all three house loads is 12 kW and a single vehicle is plugged in, the vehicle's HPCA may report a capacity to charge of 13 kW. That is, the vehicle's HPCA may be limited by either the rating of distribution transformer or the loads, i.e., 25 kW−12 kW=13 kW or the rated capacity for discharge into the grid of 15 kW, which is limited by safe discharge of the vehicle and/or the rating of the plug. If a second vehicle arrives and plugs into a second house, on the same distribution transformer, the capacity of the two vehicles may be recalculated or may be negotiated among themselves (either by a central aggregator, dispatcher, and/or via negotiation among intelligent agents of the vehicles). As one exemplary embodiment, each vehicle may split the charging capacity. In this example, the charging capacity may be 6.5 kW for each vehicle when both are charging at the same time and the discharging capacity may be 15 kW for each vehicle when both are discharging into the grid at the same time. The discharge capacity is load plus transformer capacity (12 kW+25 kW) and in this exemplary embodiment is limited by plug rating of 15 kW and is not limited by the distribution transformer rating, which is possible in other examples.

As a second exemplary embodiment using the numeric examples above, a first vehicle that requires charge sooner than other vehicles may offer only regulation-down capacity at 13 kW, while a second vehicle is mostly charged and may offer spinning reserve capacity at 15 kW.

As a third example, the first vehicle that required charge sooner may be charged at a maximum charging capacity, with the second vehicle offering capacity at 15 kW (i.e., the same calculation as in the second example). This type of graceful degradation may take priority over Hierarchical Priorities (3) through (7). These examples may relate to the sensors from utility grid 360, 370 and 380 and controls 230, 280, 305, 310 shown in FIG. 2, and the logic 280, 360, 370 and 380 shown in FIG. 2.

g) State of Charge Limit.

When a vehicle is charging, or being dispatched (e.g., agreement is reached with grid operator to provide a particular grid service) for one type of grid service, the battery's state-of-charge may change such that the grid service may be compromised. Similarly, the battery's state-of-charge may change due to driving such that the same vehicle may not provide the grid service it provided prior to the driving. As a first example, the vehicle may be providing regulation-down or valley filling services and may become fully charged, so the vehicle may not absorb any more power. As a second example, the vehicle may have been providing regulation up, synchronous reserves, or peak reduction services (or may have been driving), and may not any longer provide one or more of these services. The adaptation module may shift the vehicle to another grid service, or into a charge-only mode. As a third example, if the battery becomes filled (fully charged) during regulation down service, the adaptation module may shift to a spinning reserve market service or a reactive power compensation mode service, neither of which causes further charging. These examples relate to a balance between, for example, Hierarchical Priorities (2), (4), (5) and (6) or (7).

h) Safety Sensor Failure.

While providing grid services or charging, a safety sensor may fail. For example, the distribution transformer may have a power limit and a temperature limit, and the temperature sensor on the distribution transformer may fail. This failure may lead to an over temperature condition described in examples (e) and (f) above may not be detected. In the case of a sensor failure, graceful degradation may include the scaling back of: (1) the grid service capacity promised; or (2) the power rate of such services. This may be an overriding priority to Hierarchical Priorities (2) through (7).

i) Authorization Failure for Emergency Power.

Vehicles may be used to provide uninterrupted power to a building or a local part of the distribution system. In this mode, vehicles may discharge to an isolated local grid after a power failure. To provide this emergency power service may require multiple checks. In one exemplary embodiment, the checks may include: (1) approval from the local distribution company and the building owner or property manager, among others; (2) electronic or manual validation that isolation switches are opened for the local part of the distribution system (e.g., the lines are isolated); and (3) confirmation from peer vehicles that: (i) they will provide the emergency power; and/or (2) they have sufficient vehicle power (and sustainable capacity) to properly energize the isolated lines for a predetermined period of time. As another exemplary embodiment, a fault may develop within a substation that causes a drop in power to a distribution feeder. The controller 305, acting with other computing entities: (1) may request/seek approval from the distribution system operator to energize the distribution feeder up to the substation; (2) may generate commands to cause one or more isolation switches to open between the substation and the feeder on the feeder side of the fault, thus, isolating the distribution feeder as an independent island; (3) may request a verification that the one or more isolation switches have been opened to isolate the distribution feeder; 4) may request/seek agreement from other vehicles providing the emergency power to the distribution feeder that there is enough vehicle power/capacity to sufficiently energize the feeder and that the vehicles agree to provide such power/capacity. That is, the total committed power/capacity of the vehicles is checked against the power rating of the distribution feeder to determine the sufficiency of the composite power/capacity. If any of the above conditions fail to be meet, controller 305, acting with other computing entities, may repeat the process for a more localized load (i.e., may attempt to supply emergency power, for example, to a portion of the distribution feeder or a building). That is, if authorization for the entire feeder fails, HPCA next may attempt to achieve authorizations within one or more distribution transformers on the feeder. If any of the above conditions fail to be met for the one or more distribution transformers, and if there are multiple buildings on one distribution transformer, the same sequence may be attempted for each building. If any of these authorizations fail, graceful degradation process (a) related to anti-islanding, as described above, may be applied such that the vehicles may be prohibited from energizing. This is a specification of operation within, for example, Hierarchical Priority (3).

It is contemplated that the methods previously described may be carried out within a computer. The computer including a computer readable medium for storing program code to execute the particular steps of the method. Such computer-readable medium includes integrated circuits, magnetic and optical storage media. It is also contemplated that is it possible that the methods previously described may be carried out in a distributed processing environment with multiple processors each performing particular functions by means of computer readable media.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. An apparatus for managing energy flow, the apparatus comprising:
a controller configured to control a vehicle power conversion unit to transfer energy between a utility grid and a vehicle energy storage unit based on anticipated energy usage of the vehicle and utility grid data.

2. The apparatus according to claim 1, further comprising an adaptation module for measuring historical usage of the system and determining the anticipated use of the system in accordance with at least the measured historical usage.

3. The apparatus according to claim 2, wherein the adaptation module determines the anticipated use of the system in accordance with the measured historical usage and operator inputs.

4. The apparatus according to claim 2, wherein the adaptation module is configured to determine an anticipated use profile indicating the anticipated use of the system over an anticipated time frame and the controller selectively controls the power conversion unit to transfer energy based on the determined anticipated use profile.

5. The apparatus according to claim 1, wherein the system is configured to be movable such that the system is connectable to the utility grid at different connection locations.

6. The apparatus according to claim 1, wherein the controller selectively controls the power conversion unit to transfer energy to the energy storage unit or transfer energy from the energy storage unit based on the anticipated use and a signal indicative of a current value of the energy.

7. The apparatus according to claim 1, wherein the energy storage unit is at least one of: (1) a battery for storing energy in a form of electrical energy; (2) a capacitor unit for storing energy in a form of electrical energy; (3) a mechanical unit for storing energy in a form of inertia, (4) a fuel storage unit for storing energy via a chemical reaction; (5) the fuel storage unit for storing energy via an electrochemical reaction; or (6) the fuel storage unit externally recharged with a fuel.

8. The apparatus according to claim 2, wherein the system is a vehicle and the adaptation module includes:
a usage database for storing historical use data of the vehicle indicating each use of the vehicle including information for estimating the energy consumed by the vehicle during each respective use according to a driver of the vehicle; and
a utility grid connection table for storing information about availability and capacity for connection of the vehicle to a utility grid location indicated by the historical use data.

9. The apparatus according to claim 8, wherein the adaption module is configured to determine a most likely future use profile for the vehicle based on the historical use data stored in the usage database and the controller is configured to: (1) calculate a level of energy for storage in the energy storage unit during an anticipated time frame based on the use profile; and (2) control the power conversion unit to transfer energy from the energy storage unit or transfer energy to the energy storage unit based on at least a current level of energy stored in the energy storage unit and the calculated level of stored energy predicted to be used for subsequent travel.

10. The apparatus according to claim 1, wherein the controller selectively controls the power conversion unit to transfer energy between the utility grid and the energy storage unit in accordance with a set of hierarchically prioritized rules based at least in part on: (1) input signals to the controller indicating operating characteristics of the vehicle; and (2) an anticipated use signal to the controller based on the anticipated use of the vehicle.

11. The apparatus according to claim 10, further comprising an adaptation module configured to estimate the anticipated use of the vehicle and to output an anticipated use signal to the controller.

12. The apparatus according to claim 10, wherein the set of hierarchically prioritized rules are further based on one or more revenue/cost signals to the controller indicating estimated revenues/costs for transferring energy between the utility grid and the energy storage unit.

13. The apparatus according to claim 10, wherein the controller adjusts one or more of: (1) a direction of the transfer of the energy; (2) a rate of the transfer of the energy; or (3) a timing of the transfer of the energy.

14. The apparatus according to claim 10, wherein responsive to the controller determining that at least one signal received by the controller is defective, the controller reduces the transfer of energy between the utility grid and energy storage unit based on secondary information derived from other input signals received by the controller that are not defective.

15. The apparatus according to claim 10, wherein:
one of the input signals received by the controller includes a grid control signal indicating one or more values associated with (1) the transfer of energy between the utility grid and energy storage unit or (2) capacity of the energy storage unit; and
when the grid control signal is defective, the controller controls the transfer of energy using a local detection signal indicating one or more thresholds associated with a connection between the vehicle and the utility grid.

16. The apparatus according to claim 11, wherein the adaptation module includes a usage database to store historical use data regarding anticipated use of the vehicle and wherein when the historical use data stored in the usage database is not available, the controller controls transfer of energy between the utility grid and the energy storage unit based on a default charging cycle that enables maximum range for the vehicle at a predetermined time of day.

17. The apparatus according to claim 11, further comprising a driver identification unit for identifying each respective driver of the vehicle, wherein the adaptation module stores historical use data for each respective driver and generates an anticipated use profile for the respective driver identified by the driver identification unit.

18. The apparatus according to claim 11, wherein:
the adaptation module determines a historical use profile based on the stored historical use data;
when the historical use profile of the vehicle deviates from an actual use profile of the vehicle by more than a threshold amount, the adaptation module determines whether a driver of the vehicle has changed,
if the driver of the vehicle has changed, the adaptation module selects a first control mode in which the driver is periodically queried for confirmation of vehicle destinations; and
if the driver of the vehicle has not changed, the adaptation module selects a second control mode in which energy storage by the energy storage unit is increased relative to when the historical use profile deviates from the actual use profile of the vehicle by less than the threshold amount.

19. The apparatus according to claim 18, wherein:
if the adaptation module selects the first control mode, the controller enters into a learning mode to collect information for re-evaluating driving patterns and vehicle operations of the changed driver.

20. A method of managing vehicle energy flow, comprising:
determining historical enemy usage of a vehicle;
calculating an anticipated energy usage of the vehicle based on the historical energy usage of the vehicle; and
selectively controlling, by a controller, bi-directional transfer of energy between a utility grid and the vehicle based on the anticipated energy usage of the vehicle.

21. The method according to claim 20, wherein the determining historical usage includes:
storing, in a usage database, historical use data of the vehicle indicating each use of the vehicle including information for estimating the energy consumed by the vehicle during each respective use according to each driver of the vehicle; and
storing, in a utility grid connection table, information about availability and capacity for connection of the vehicle to the utility grid at locations indicated by the historical use data.

22. The method according to claim 21, wherein the selectively controlling includes:
determining a most likely use profile for the vehicle based on the historical use data stored in the usage database;
calculating a level of energy for storage in the vehicle during an anticipated time frame based on the use profile; and
controlling the transfer of energy between the utility grid and the vehicle based on at least a current level of energy stored in the vehicle and the calculated level of the energy.

23. The method according to claim 20, wherein the selectively controlling is in accordance with hierarchically prioritized rules based at least in part on: (1) input signals to the controller indicating operating characteristics of the vehicle; and (2) an anticipated use signal to the controller indicating the anticipated use of the vehicle.

24. The method according to claim 23, further comprising:
determining, by the controller, whether one or more of the signals are improper,
when one or more of the signals are improper, adjusting the transfer of energy between the utility grid and the vehicle using non-improper signals received by the controller.

25. The method according to claim 20, further comprising:
determining a historical use profile of the vehicle from the historical use data;
comparing a current use profile of the vehicle to the historical use profile;
determining whether the current use profile deviates from historical use profile by more than a threshold amount;
if the current use profile deviates from the historical use profile by more than the threshold amount and a driver of the vehicle has changed, selecting a first control mode in which the driver is periodically queried for confirmations of vehicle destinations; and
if the current use profile deviates from the historical use profile by more than the threshold amount and if the driver has not changed, selecting a second control mode in which energy storage by the vehicle is increased relative to when the historical use profile deviates from the actual use profile of the vehicle by less than the threshold amount.

26. The method according to claim 20, further comprising communicating, by the vehicle, a service offering to a grid operator including at least one of: (1) a regulation-down service; (2) a regulation-up service; (3) a reserve service; (3) a valley filling service; (4) a reactive power service; (5) a peaking service; or (6) an emergency backup service.

27. The method according to claim 23, further comprising:
determining that at least one of the input or use profile signals received by the controller is defective; and
reducing the transfer of energy from the vehicle based on secondary information derived from other signals received by the controller that are not defective.

28. The method according to claim 20, further comprising:
responsive to the vehicle transferring energy to the utility grid and one of a grid fault or loss of grid power occurs, preventing further energy from being transferred from the vehicle.

29. The method according to claim 20, further comprising:
when the vehicle provides grid services or transfers energy to the utility grid and a part of the utility grid has a maximum rating limit, reducing, by the vehicle, the energy transferred between the utility grid and the vehicle to prevent exceeding the maximum rating limit.

30. The method according to claim 20, further comprising:
when the vehicle is being dispatched for one type of grid service, monitoring a stored energy level in an energy storage unit of the vehicle; and
if the stored energy level indicates that the one type of grid service dispatched from the vehicle is compromised by the stored energy level in the energy storage unit, changing to a different type of grid service for subsequent dispatch.

31. A computer readable medium storing program code for execution on a computer to implement the method of claim 20.

* * * * *